(12) United States Patent
Pfeifer et al.

(10) Patent No.: US 9,463,593 B2
(45) Date of Patent: Oct. 11, 2016

(54) METHOD FOR PRODUCING A TOOTHBRUSH HAVING AN INNER CAVITY

(71) Applicant: The Procter & Gamble Company, Cincinnati, OH (US)

(72) Inventors: Ulrich Pfeifer, Kronberg (DE); Matthew Lloyd Newman, Mason, OH (US); Li Wen, Mason, OH (US); Andreas Birk, Kronberg (DE); Andreas Bresselschmidt, West Chester, OH (US); Andrew Joseph Horton, West Chester, OH (US); Siegfried Kurt Hustedt, Kronberg (DE); Jochen Erich Kawerau, Kronberg (DE); Heidrun Annika Schmelcher, Kronberg (DE); Franziska Schmid, Kronberg (DE); Jens Uwe Stoerkel, Kronberg (DE); Benjamin John Wilson, Kronberg (DE); Tilmann Winkler, Kronberg (DE)

(73) Assignee: THE PROCTER & GAMBLE COMPANY, Cincinnati, OH (US)

( * ) Notice: Subject to any disclaimer, the term of this patent is extended or adjusted under 35 U.S.C. 154(b) by 605 days.

(21) Appl. No.: 13/683,801

(22) Filed: Nov. 21, 2012

(65) Prior Publication Data
US 2014/0138880 A1 May 22, 2014

Related U.S. Application Data

(60) Provisional application No. 61/562,675, filed on Nov. 22, 2011.

(51) Int. Cl.
 B29L 31/42 (2006.01)
 B29C 49/06 (2006.01)
 (Continued)

(52) U.S. Cl.
 CPC ............. *B29C 49/6409* (2013.01); *A46B 5/02* (2013.01); *A46D 3/00* (2013.01); *B29B 11/08* (2013.01); *B29C 45/0053* (2013.01);
 (Continued)

(58) Field of Classification Search
 CPC ..... B29C 49/06; B29C 49/12; B29C 49/085; B29C 45/1704; B29C 2059/023; B29C 35/0255; B29C 35/0261; B29C 33/424; B29C 33/426
 USPC .................... 264/523, 535, 532, 537; 300/21
 See application file for complete search history.

(56) References Cited

U.S. PATENT DOCUMENTS 2,651,810 A * 9/1953 Snyder .......................... 264/519
3,936,261 A 2/1976 Jones et al.
(Continued)

FOREIGN PATENT DOCUMENTS

CN 2756064 2/2006
CN 102166064 8/2011
(Continued)

OTHER PUBLICATIONS

Society of Plastics Engineers Blow Molding Division, Dec. 2001, p. 8.*
(Continued)

*Primary Examiner* — Jeffrey Wollschlager
*Assistant Examiner* — Armand Melendez
(74) *Attorney, Agent, or Firm* — James E. Oehlenschlager

(57) ABSTRACT

Methods of producing toothbrush handles having an inner cavity are provided.

8 Claims, 10 Drawing Sheets

(51) Int. Cl.
  *B29C 49/08* (2006.01)
  *B29C 49/12* (2006.01)
  *B29C 49/04* (2006.01)
  *B29B 11/08* (2006.01)
  *B29C 49/64* (2006.01)
  *A46B 5/02* (2006.01)
  *A46D 3/00* (2006.01)
  *B29C 49/20* (2006.01)
  *B29C 45/00* (2006.01)
  *A46B 15/00* (2006.01)
  *B29L 21/00* (2006.01)
  *B29C 49/36* (2006.01)

(52) U.S. Cl.
  CPC .............. *B29C 49/06* (2013.01); *B29C 49/20* (2013.01); *A46B 15/0085* (2013.01); *A46B 15/0093* (2013.01); *A46B 2200/1066* (2013.01); *B29C 49/04* (2013.01); *B29C 49/12* (2013.01); *B29C 49/36* (2013.01); *B29C 2049/2017* (2013.01); *B29L 2021/00* (2013.01); *B29L 2031/425* (2013.01)

(56) References Cited

U.S. PATENT DOCUMENTS

| | | | |
|---|---|---|---|
| 3,996,330 A * | 12/1976 | Jones et al. | 264/328.9 |
| 4,802,255 A | 2/1989 | Breuer et al. | |
| 5,052,071 A | 10/1991 | Halm | |
| 5,268,005 A | 12/1993 | Suhonen | |
| 5,313,909 A | 5/1994 | Tseng et al. | |
| 5,564,152 A | 10/1996 | Jeannet et al. | |
| 5,722,106 A | 3/1998 | Masterman et al. | |
| 5,836,769 A | 11/1998 | Spencer | |
| 5,845,358 A * | 12/1998 | Woloch | 15/111 |
| 5,804,127 A | 3/1999 | Kim et al. | |
| 6,018,840 A | 2/2000 | Guay et al. | |
| 6,058,541 A | 5/2000 | Masterman et al. | |
| 6,066,282 A * | 5/2000 | Kramer | 264/251 |
| 6,151,745 A | 11/2000 | Roberts et al. | |
| 6,475,553 B2 | 11/2002 | Guay et al. | |
| 6,553,604 B1 | 4/2003 | Braun et al. | |
| 6,679,696 B1 * | 1/2004 | McConnell et al. | 425/112 |
| 6,796,785 B2 | 9/2004 | Kawamoto et al. | |
| 6,818,174 B2 * | 11/2004 | Morawski | 264/572 |
| 7,389,781 B2 | 6/2008 | Kemp et al. | |
| 8,297,710 B2 | 10/2012 | Sakurai et al. | |
| 8,382,208 B2 | 2/2013 | Baertschi | |
| 8,568,634 B2 | 10/2013 | Porter et al. | |
| 2002/0074698 A1 | 6/2002 | Morawski | |
| 2003/0163881 A1 * | 9/2003 | Driesen | A46B 9/025 15/22.1 |
| 2003/0183242 A1 | 10/2003 | Kemp et al. | |
| 2004/0154112 A1 | 8/2004 | Braun et al. | |
| 2004/0221410 A1 | 11/2004 | Padula | |
| 2005/0036821 A1 | 2/2005 | Pfenniger et al. | |
| 2005/0170113 A1 | 8/2005 | Hill | |
| 2005/0170114 A1 * | 8/2005 | Hill | 428/35.7 |
| 2005/0188487 A1 | 9/2005 | Moskovich et al. | |
| 2006/0080794 A1 | 4/2006 | Punshon | |
| 2006/0151539 A1 | 7/2006 | Tsubaki et al. | |
| 2006/0272112 A9 | 12/2006 | Braun et al. | |
| 2007/0163064 A1 | 7/2007 | Wong et al. | |
| 2007/0251040 A1 | 11/2007 | Braun et al. | |
| 2007/0272652 A1 * | 11/2007 | Beale | 215/398 |
| 2011/0041272 A1 | 2/2011 | Prencipe et al. | |
| 2012/0031870 A1 * | 2/2012 | Porter et al. | 215/40 |
| 2014/0047656 A1 | 2/2014 | Newman et al. | |
| 2014/0137349 A1 | 5/2014 | Newman et al. | |
| 2014/0137350 A1 | 5/2014 | Wen et al. | |
| 2014/0137353 A1 | 5/2014 | Wen et al. | |
| 2014/0137354 A1 | 5/2014 | Newman et al. | |

FOREIGN PATENT DOCUMENTS

| | | |
|---|---|---|
| CN | 2160251 | 10/2015 |
| DE | 4136537 | 1/1993 |
| DE | 19531368 | 2/1997 |
| DE | 10023725 | 11/2001 |
| DE | 102005036301 | 2/2007 |
| EP | 0668140 | 8/1995 |
| EP | 0721832 | 4/1999 |
| EP | 1639913 | 3/2006 |
| JP | H1016037 | 1/1998 |
| WO | WO2004077996 | 9/2004 |

OTHER PUBLICATIONS

International Search Report, mail date Aug. 1, 2013, 10 pages.
U.S. Appl. No. 13/683,445, filed Nov. 21, 2012, Matthew Lloyd Newman et al.
U.S. Appl. No. 13/683,495, filed Nov. 21, 2012, Cathy Wen et al.
U.S. Appl. No. 13/683,655, filed Nov. 21, 2012, Matthew Lloyd Newman et al.
U.S. Appl. No. 13/683,716, filed Nov. 21, 2012, Cathy Wen et al.
U.S. Appl. No. 13/683,744, filed Nov. 21, 2012, Matthew Lloyd Newman et al.

* cited by examiner

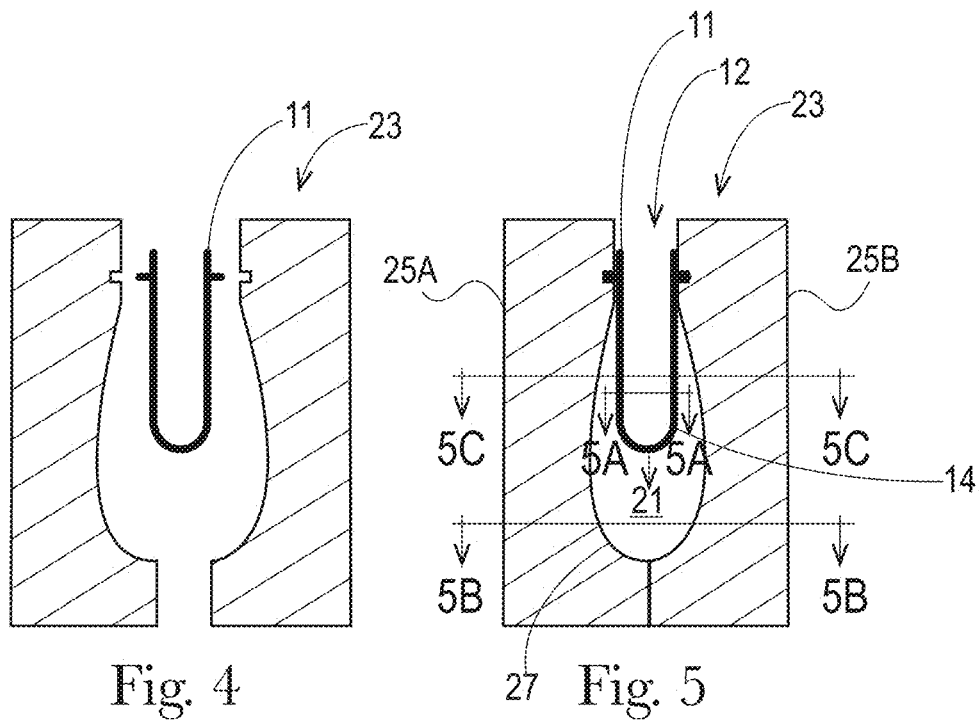
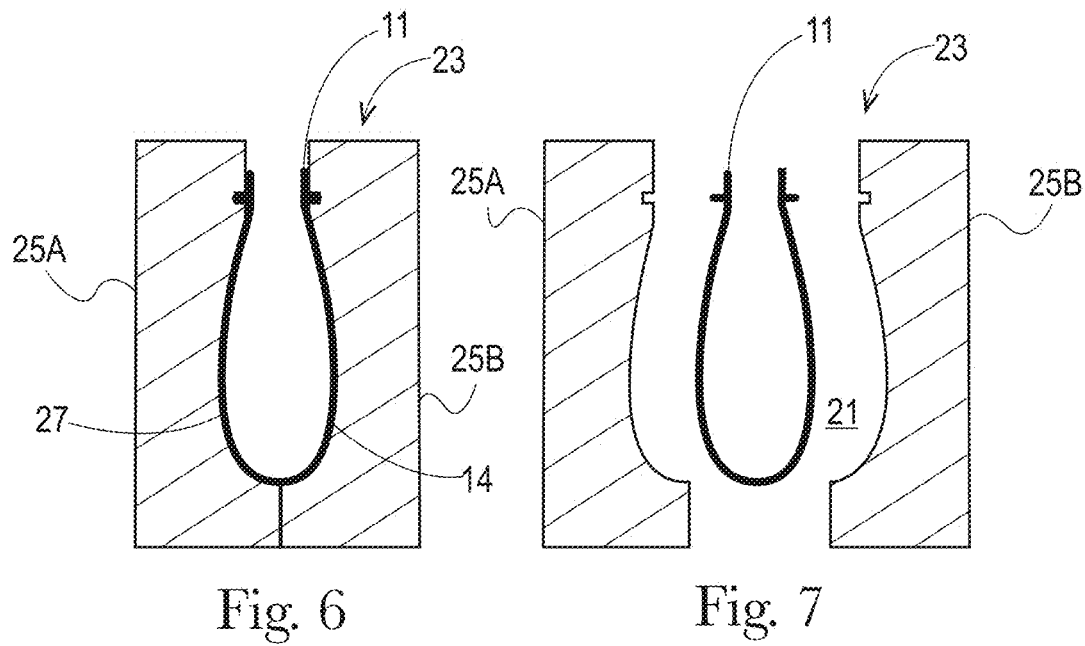
Fig. 4  Fig. 5
Fig. 6  Fig. 7

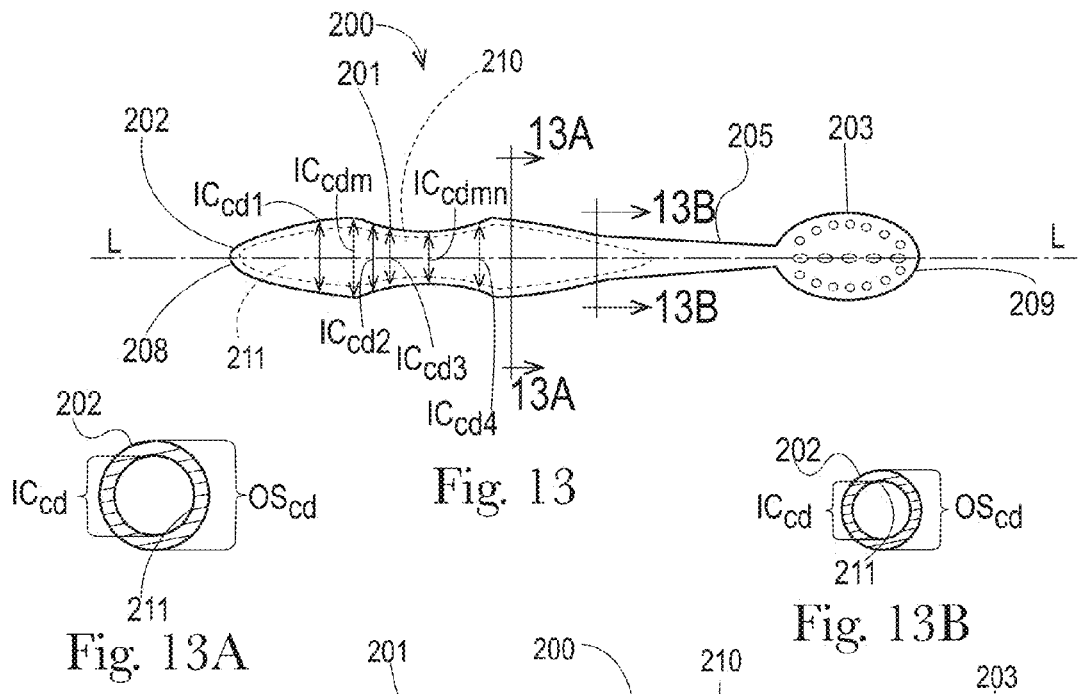
Fig. 13
Fig. 13A
Fig. 13B
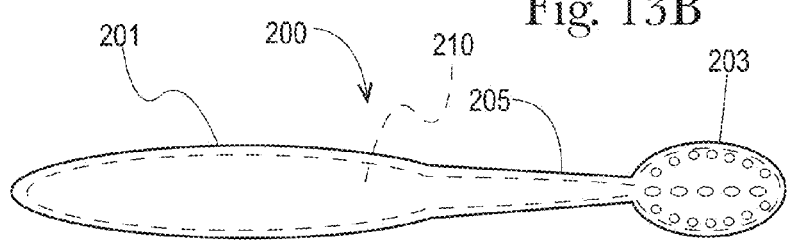
Fig. 14
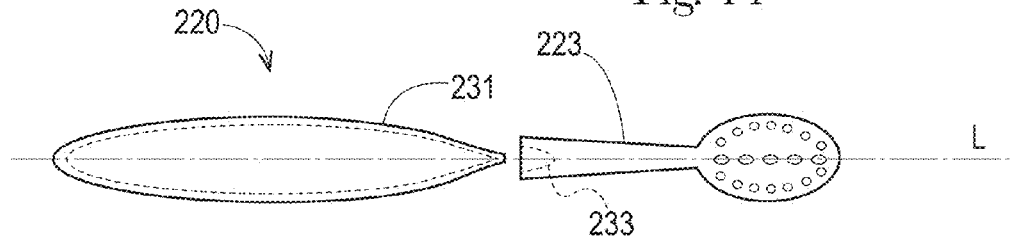
Fig. 15
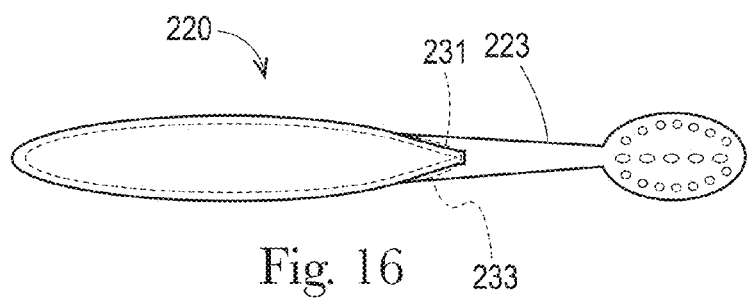
Fig. 16

METHOD FOR PRODUCING A TOOTHBRUSH HAVING AN INNER CAVITY

FIELD OF THE INVENTION

The present invention relates to methods of producing personal care articles such as toothbrush handles having an inner cavity

BACKGROUND OF THE INVENTION

Toothbrushes are typically manufactured using an injection molding process. Such an injection molding process is characterized by providing a mold in the shape of the toothbrush and injecting molten plastic through a hot channel nozzle into the mold. The toothbrush is then cooled and ejected from the mold. For example, U.S. Pat. No. 5,845,358 shows such a toothbrush made by injection molding. This injection molding process may comprise a single injection molding step for a toothbrush made from a single component, or it may also comprise two or more injection molding steps for toothbrushes made from two or more components or materials. The second or subsequent materials may be of a significantly softer durometer than the first material to increase grip or provide distinctive design elements. Such an injection molding process is characterized by providing a mold in the shape of a portion of the toothbrush and injecting a first molten plastic through a hot channel nozzle into the mold, waiting some time for the part to sufficiently cool, then transferring the solid or semi-solidified part to a second molding cavity where a second material is injected into the void formed by the combination of the second mold and some surfaces of the first molded part. The toothbrush is then cooled and ejected from the mold. For example, U.S. Pat. No. 6,276,019 shows such a toothbrush made by injection molding. One of the limitations of the conventional injection molding processes is that large diameter handles cannot be produced in an efficient manner, due to the cost of increased material and lengthened cooling times, resulting from the increased mass of material used.

Toothbrushes with increased handle diameters provide substantial advantages, for instance they can provide increased gripping area for children, increasing the ability of children to handle and use toothbrushes; also people with disabilities such as arthritis sometimes have difficulty in handling toothbrushes due to difficulty in flexing the joints in their hands. Such difficulties are considerably relieved by means of toothbrushes having increased handle diameters. Additionally, the larger cross section handles on the toothbrushes are better for the user from an ergonomic point of view.

Toothbrushes with high-friction and/or low-durometer regions of a second material on the outer surface also provide substantial advantages in gripping. Low-durometer materials, such as those materials whose hardness is measured at less than approximately 90 on the Shore A scale, provide advantages in grip by deforming under the range of comfortable gripping forces. The deformation assists in holding the brush uniformly in position in the hand, and also provides a pleasing tactile feedback. Addition of high-friction grip surfaces directly reduces the squeezing force necessary to maintain a stable orientation of the brush bristles during use. Due to their low strength, however, toothbrushes made entirely from high-friction, low-durometer material are unlikely to exhibit the bend strength necessary to provide adequate force to brush in a conventional grip style. Thermoplastic Elastomers (TPEs) in the hardness range of Shore A 20-90 are a common second, third or subsequent material used to improve grip on toothbrushes and other personal care articles.

Variations in cross sectional area, including both larger and smaller cross sectional areas, along the length or major axis of the brush assist the user in the grip and handling of the brush during use, when it must be rapidly moved, often while wet or slippery. Additionally, materials that maintain a higher coefficient of friction when wet, including TPEs in the above-mentioned hardness range can assist in wet-grip situations.

Even though there are advantages to toothbrushes having increased handle diameters the use of injection molding to manufacture toothbrushes with larger cross section handles has at least six disadvantages:

First—the toothbrush is more expensive due to the use of more plastic to make the toothbrush. The material used to create the toothbrush handle increases approximately with the square of the diameter of the handle.

Second—the cost of manufacture is increased because the time needed to cool and solidify the toothbrush increases considerably. The increased cooling time is due both to the increased quantity of hot plastic, and the larger cross section of the toothbrush. As plastic has a relatively low thermal conductivity, extracting heat from the center of the brush is substantially more difficult with an increased cross section. It is known to those familiar in the art that overall cooling time for all molding cycles for a multi-component brush can be minimized by balancing the size of each shot of plastic so that the brush is substantially uniformly divided by weight for each component, however this has the drawback of requiring a greater fraction of use of an expensive material, typically TPE, than would otherwise be required. In essence, both material use and capital equipment time cannot both be simultaneously optimized for this type of injection molded toothbrush.

Third—most thermoplastics shrink during cooling and solidification. Shrinkage can be mitigated by packing additional molten plastic into the center of the handle through the injection gate as the outer edges of the handle cool, however this mitigation loses effectiveness as the injection gate is placed away from the thickest portion of the handle and placement of the gate, which will have some tactile vestige, in the thick, gripping portion of the handle can lead to dissatisfaction during use. For many toothbrush handle designs, packing alone cannot mitigate the visible surface shrinkage and surface defects and internal defects associated with an increased handle cross section. These surface defects can be manifested as unintentional variations in surface gloss or texture, which contribute negatively to the look and feel of the part. Internal defects can be manifested as voids or bubbles inside the plastic, which can weaken the handle visibly or invisibly, depending on the degree of transparency of the plastic. It is known to those familiar in the art that a second component can be used to cover or hide negative cosmetic features such as gate vestiges or sink marks, however this cannot by nature work on the final shot which must necessarily have an uncovered gate vestige and may also contain sink marks in thick sections.

Fourth—the filling and packing of a thick-wall plastic parts in the injection mold cavity requires very high pressures, typically thousands of pounds per square inch, which necessitates mold cavities made from very high-strength materials, which are expensive and time-consuming to create. These extremely high pressures can in fact limit the speed of the manufacturing process by requiring complete or near-complete cooling and/or solidification of one plastic shot prior to injection of a subsequent shot.

Fifth—the injection of multiple shots of plastic in multiple steps necessarily requires each component of material to have at least one unique mold cavity portion which significantly adds to expense, complexity and difficulty in molding, especially where plastic and metal meet to form an edge, also known as a shutoff.

Sixth in multi-cavity production, the balance of fill between shots is especially difficult to control with TPEs, as they have a narrow range of processing temperatures and their viscosities do not vary substantially over this range.

In an attempt to overcome the difficulties associated with the use of injection molding to produce toothbrush handles having increased diameters, it has been suggested to produce toothbrush handles having a hollow body. For example, EP 0 668 140 or EP 0 721 832 disclose the use of air assist or gas assist technology to make toothbrushes having hollow, large cross-sectional handles. In the disclosed process, molten plastic is injected near the base of the toothbrush handle, wherein subsequently a hot needle is inserted into the molten plastic to blow gas into the molten plastic which is then expanded towards the walls of the injection mold. In a similar manner, U.S. Pat. No. 6,818,174 B2 suggests injecting a predetermined amount of molten plastic into the cavity to only partially fill the mold cavity and subsequently inject a gas through a gas injection port formed in the injection mold to force the molten plastic into contact with the walls of the mold cavity. Such injection molding processes using additional air injection have substantial difficulty forming hollow handle bodies with substantially uniform wall thickness, and as such, the potential for optimization of a handle for maximum ergonomic function in minimum material weight and manufacturing efficiency is limited. A further drawback to such injection molding processes in U.S. Pat. No. 6,818,174 B2 is the creation of a vent hole for the gas. EP 0 668 140 provides a possible solution to this problem via use of a moving injection pin to create a sealed part, however the integrity of this seal under the injection molding pressures created in the second shot is highly sensitive to processing conditions and is therefore not known. The vent hole is formed at the interface of molten plastic and high-pressure gas (and not by mold steel) and thus cannot be made predictably or with high precision. A still further drawback of hollow-handled toothbrushes made using gas-assist injection molding relates to the application or installation of a second, third or subsequent material to the toothbrush by injection molding, or overmolding, where the overmolded material may, in the process of sealing the necessary gas vent, intrude substantially into the hollow void created in the first gas injection step, as there is nothing to stop it besides friction and the near-atmospheric pressure inside the void. EP 0 721 832 illustrates this effect in detail. While this may still result in a cosmetically-acceptable part, it prevents use of shot-size-limiting devices such as valve gates and can add substantially to the cost of the part. Gas-assist injection molding does not substantially reduce injection pressure or melt energy required to form a plastic article. And as with all other known injection molding processes, multiple cavities and injection steps are required to add each material to the molded article.

A conventional method to create toothbrush handles having increased cross sections, such as electromechanical toothbrush handles, is to manufacture discrete parts of the handle separately using injection molding, then to assemble these parts in either a separate non-injection molding step, or in a subsequent injection molding step, or most often some combination of the two, whereby the discrete parts from the first step or steps are inserted into an injection mold first and one or more additional materials are injected around them, creating a hollow body from multiple parts. This manufacturing method still has the drawbacks of: requiring the complete melting of plastic at every molding step, high pressures at every molding step, associated equipment involved with injection molding at every molding step, and in addition may have added labor expense associated with both in-mold and out-of-mold assembly of discretely-molded parts, plus the added expense and inconvenience of multiple steel cavity sets per part manufactured. The use of injection molding to create multiple discrete parts has also the disadvantage that each part must not contain any substantial undercut from which the mold core forming a concave surface of the injection-molded part could not be extracted from the part after molding; or in the case where such undercut exists, it must be created carefully by means such as collapsing mold cores and is thus subject to extensive constraints on the surrounding geometry. Further, mold cores must typically contain some mechanism to cool or remove heat, and would thus be difficult or impossible to create to make internal geometry for most manual toothbrushes which may have diameters of 10 mm and lengths beyond 150 mm. The lack of undercuts in discrete parts combined with the length and diameter of cores required to make non-undercut handle parts combined with the desire for multiple areas of variation in cross sectional area on a toothbrush handle would thus require any discretely-assembled handles to have multiple mating surfaces which would preferably require seals to maintain barriers to moisture and debris, even under time and repeated use. To eliminate the need for gaskets and expensive, pliant materials, these seals are typically made using permanent-fastening operations such as ultrasonic welding or gluing.

Installation of soft-touch or other second materials to hollow molded articles can be made by non-injection molding means such as welding, gluing or use of flexibility of the soft-touch material to itself grip an undercut pre-molded into the main article. These methods all have disadvantages however in long-term adhesion, especially to thermoplastics with less-active surfaces made from materials such as polypropylenes. Durable articles made from multiple components which must be used in unpredictable circumstances and environments such as consumers' bathrooms must necessarily be constructed more robustly than for example, disposable articles or packages.

Electromechanical toothbrushes in particular are susceptible to problems of assembly, as they are necessarily hollow in order to include batteries, motors and associated electrical linkages and drive components which must be all placed inside with some degree of precision. To avoid the problems and expense of welding plastic parts together and multiple assembly steps of a sealed outer shell, it has been proposed to blow mold the handle for electromechanical toothbrushes. In the assembly of a blow molded electromechanical toothbrush it is necessary to leave the blow molded portion of the handle open in at least one end to accommodate the motor, batteries, and drive system components. In this process, the minimum diameter of at least one opening to the blow molded handle must exceed the smallest linear dimension of every component that will be inserted. Such a large opening would be a drawback in a non-electromechanical handle, which has no need to accommodate internal component entry, and would necessitate an overly-large second part or cap to prevent intrusion and collection of water, paste, saliva and other detritus of conventional use. Such an overly-large opening, if positioned near the head, would interfere substantially with ergonomic use of the brush. Additional constraints to the geometry on the inside surface of the cavity, for example to locate motors, housings, batteries, etc. which must be positioned inside accurately as to be rigidly fixed will also be detrimental to the overall blow molding process, as the majority of the inner cavity surface of a blow molded part cannot be defined directly by steel in the mold surfaces, and is instead defined indirectly by steel on the outer surface of the handle combined with the wall thickness of the parison, blowing pressure and stretch ratio of the final part to the original parison or preform thickness. Such constraints of these process variables will necessarily limit manufacturing efficiencies.

To accommodate activation of electrical components via a standard button or mechanical switch, at least some portion of a blow molded electromechanical toothbrush handle should be made thin enough to flex substantially under pressure of a finger or hand squeeze. Such a thin-walled structure or film-walled structure necessarily requires some strengthening mechanism to ensure durability and rigidity under use. An internal frame or cap, as described in WO 2004/077996 can be used to provide this necessary strengthening mechanism in an electromechanical toothbrush, but would be a drawback to a manual brush, which must contain no additional components to function adequately, in extra expense, complexity and additional load-bearing parts. Further, due to the linear nature of the motor, power source, and drive shaft of electromechanical toothbrushes there are no or minimal variations to the cross-sectional area of the inner cavity; such that the inner cavity walls provide mechanical support to the internal components to reduce or eliminate unwanted movement or shifting. Alternately, it would be required to cut or drill a hole in the blow molded part and then to fasten somehow a flexible cover to transmit the mechanical motion from the outside of the brush to the switch inside.

An electromechanical toothbrush handle, made by blow molding or injection molding, is typically manufactured with an opening at both ends: At a distal end there is typically an opening to accommodate the mechanical translation of power through a drive mechanism to the toothbrush head, and at a proximal end there is typically an opening to accommodate insertion of components during manufacturing and possibly also insertion or removal of the battery by the user. Such a second opening would be unnecessary for a manual toothbrush and would create drawbacks in the need for additional seals and mechanical fasteners. In some blow molding processes, the formation of openings at the distal and proximal ends of the molded part are intrinsic to the process and would benefit the formation of a double-open-end handle, but would not be necessary for a manual toothbrush handle.

To reduce weight while maintaining stiffness, some toothbrush handles are made from bamboo or balsa wood, however these materials have disadvantages in that they are not easily formable into complex three-dimensional shapes which can be comfortably gripped. Further, these materials are anisotropic, meaning they have elastic moduli and yield strengths or ultimate strengths which vary with the direction of applied load. Carbon-fiber composites and glass-filled injection-molded plastics are other common examples of anisotropic materials which could be used to make lighter and stronger toothbrushes. Articles made from these materials must therefore be formed with their strongest axis or 'grain' aligned substantially with the major axis of the article in order to resist fracture during the bending forces common to use. Both carbon fiber and glass-filled thermoplastic composites also tend to fail in a brittle manner, with little ductility. This type of failure is undesirable in a device that is placed in the mouth: More desirable is a device which, when subjected to loads substantially greater than their design loads, fail first in some permanent bending mode versus a sudden fracture. Further, these materials do not contain intrinsically all of the properties necessary to create light weight, strength in bending and soft-touch, high-friction grip. This creates an extra necessary step in the preparation of the material prior to forming or machining. This alignment of the grain also can present a specific disadvantage to woods in general in that the presentation of splinters of material is most likely to occur in the direction aligned to typical forces applied by the hand during brushing.

To make a toothbrush without relying on anisotropic materials such as woods, the articles could be made lighter through the use of non-homogeneous but isotropic materials, such as foamed plastics. Foamed plastics present an advantage in that they can offer a higher strength-to-weight ratio than solid plastics without regard to material orientation. The overall weight savings possible with foamed plastics may be limited however, as the bubbles inside the plastic which create the weight savings also create stress concentrations which will severely reduce strength in tension and can reduce ductility. While foamed plastics can provide substantial strength in compression (and are used for exactly this purpose in applications such as packing materials where material weight combined with resistance to compressive crushing is a critical issue) the weakness in tension severely affects bending strength and prevents uniformly-foamed plastics from serving as load-bearing elements in articles which must maintain strength and stiffness in bending during normal use.

It is familiar to those in the art to use extrusion blow molding to create single-component or single-material light-weight hand-held articles, such as children's toys, plastic bats, plastic golf clubs or any large, plastic article which benefits from being lighter in weight. While these articles can be both stiff and strong in bending, they also generally contain drawbacks which would limit their general use in semi-durable, Class-I medical devices, such as toothbrushes. First, such articles typically contain significant flash along parting lines, or in any locations where the parison is larger in cross sectional area than is the cavity to which it is blown. In these locations the parison folds within the cavity and substantial flash is created, even in the absence of cavity parting line. Second, most articles contain some significant vestige of blowing in the form of a hole, which may be accurately or inaccurately formed. Such a vestige would be regarded as a significant defect in a Class-I medical device which must prohibit breach or entry of contaminants to a hollow interior which does not drain effectively. Third, the relative size of these articles is large in comparison to the size of these defects, and the overall function of the articles is not severely affected by these defects. In many cases, the size of the article itself renders the manufacturing process easier, with respect to the minimization of defects. It is not challenging to extrusion blow mold articles, packages or bottles in the size range common to manual toothbrush handles—if the plastic wall thickness can be minimized in proportion to the overall cross section. Such articles exist in the form of small, typically squeezable, tubes or bottles which in fact benefit from having a very thin, deformable wall which enables dispensing of internal contents, making them unusable or significantly inferior as toothbrushes.

Extrusion and injection-blow-molded handles for single-component semi-durable consumer goods such as feather dusters and tape dispensers are also known, but again these articles would not meet criteria for semi-durable Class I medical devices, specifically with regard to the sealing of the necessary blowing orifice against intrusion of water or other contamination, and in the case of extrusion blow molding, in the appearance of flash on the articles in areas that would directly contact or go into the mouth. These articles can also be brittle, and when too much force is applied, can break or snap suddenly and without ductility, producing sharp edges, making them unusable for use in the oral cavity.

Multi-material blow molded packages, such as water bottles, are known to those familiar in the art. In these embodiments, smooth blow molded bottles are provided with tactile, high-friction surfaces via the use of an in-mold labeling technique, whereby previously injection-molded, textured labels are placed into mold cavities prior to introduction and blowing of the semi-molten parison of extruded plastic. While these articles do provide the advantage of a large gripping surface which is improved by addition of a high-friction textured surface, they are by nature highly-deformable or squeezable packages designed for liquid storage and dispensing and would serve poorly as toothbrushes as there is no obvious method to attach bristle tufts without injection molding. Further, the injection molding of the soft-grip labels requires an additional set of mold cavities and a molding step separate from the blow molding step.

It has also been proposed to manufacture hollow toothbrushes, however no existing disclosure in the prior art addresses the issues of: Strength in bending, stiffness in bending, overall rigidity, mitigation of flash or other sharp defects, variations in cross-sectional area, and obstruction or sealing of the blow hole vestige. Any one of these defects in a blow molded toothbrush or toothbrush handle would severely affect the utility of the article, and as such, improvements are needed to enable a hollow article with material savings maximized by uniform wall thickness which is suitably strong and stiff in bending without breaking in use and does not leak or present uncomfortable defects to the user.

In view of these disadvantages reflected in the prior art, it is an objective of the present invention to provide an improved method for producing a toothbrush handle, which avoids the drawbacks of the prior art.

SUMMARY OF THE INVENTION

A method for injection blow molding a toothbrush handle using thermoplastic material, is provided that comprises providing an injection mold having a cavity; injecting thermoplastic material into the injection mold cavity to form a toothbrush handle preform having an inner cavity and an outer surface, wherein the outer surface defines a cross-sectional dimension of the toothbrush handle preform; providing a blow mold having a longitudinal axis and a cavity, the cavity having a surface that defines a cross-sectional dimension having an area; wherein the cavity has at least one of a maximum cross-sectional dimension and the maximum cross-sectional dimension bordered by two smaller cross-sectional dimensions along the longitudinal axis of the blow mold or a minimum cross sectional dimension bordered by two greater cross-sectional dimensions along the longitudinal axis of the blow mold; positioning the toothbrush handle preform into the blow mold cavity; deforming the toothbrush handle preform using a fluid to produce a toothbrush handle.

A method for injection blow molding a toothbrush using thermoplastic material is provided that comprises providing an injection mold having a cavity; injecting thermoplastic material into the injection mold cavity to form a toothbrush handle preform having an inner cavity and an outer surface, wherein the outer surface defines a cross-sectional dimension of the toothbrush handle preform; providing a blow mold having a longitudinal axis and a cavity, the cavity having a surface that defines a cross-sectional dimension having an area; wherein the cavity has at least one of a maximum cross-sectional dimension and the maximum cross-sectional dimension bordered by two smaller cross-sectional dimensions along the longitudinal axis of the blow mold or a minimum cross sectional dimension bordered by two greater cross-sectional dimensions along the longitudinal axis of the blow mold; positioning the toothbrush handle preform into the blow mold cavity; deforming the toothbrush handle preform using a fluid to produce a toothbrush handle, wherein the head of the toothbrush is molded during the injection molding step and is connected intrinsically to the handle which is also molded during the injection molding step.

BRIEF DESCRIPTION OF THE DRAWINGS

FIG. 4 is a sectional view of an injection-molded preform placed between two cavity halves during an injection blow molding process according to an embodiment of the present invention.

FIG. 5 is a sectional view of an injection-molded preform located between two cavity halves during an injection blow molding process according to an embodiment of the present invention.

FIG. 6 is a section view of a preform during a blow molding step of the injection blow molding process FIG. 7 is a section view of a preform after a blow molding step of the injection blow molding process

FIG. 13 is a diagram of a toothbrush according to an embodiment of the present invention.

FIG. 13A is a cross-sectional view of FIG. 13 along section line 13A according to an embodiment of the present invention.

FIG. 13B is a cross-sectional view of FIG. 13 along section line 13B according to an embodiment of the present invention.

FIG. 14 is a diagram of a toothbrush according to an embodiment of the present invention.

FIG. 15 is a diagram of a toothbrush according to an embodiment of the present invention.

FIG. 16 is a diagram of an assembled toothbrush according an embodiment of the present invention.

DETAILED DESCRIPTION OF THE INVENTION

Figure 1:
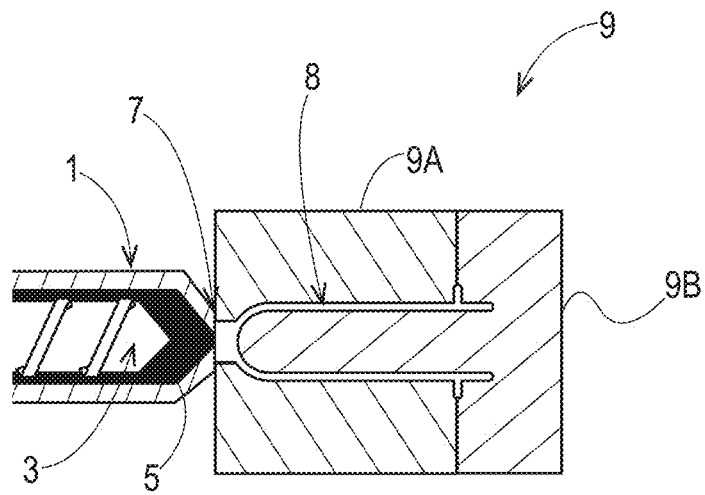
FIG. 1 is a sectional view of an injection molding step in an injection blow molding process according to an embodiment of the present invention.

The present invention relates to one or more methods for producing personal care articles, such as a toothbrush handle or toothbrush having an inner cavity, wherein the method includes a blow molding step. The blow molding step can be used on a previously injection-molded hollow body (preform), which may be blow molded immediately following the injection molding step, or which may be cooled then re-heated between the injection and blow molding steps, or which may be injection molded and preferentially heated only in select regions of the preform prior to blow molding. The blow molding step involves the positioning of a preform into a cavity and expansion of the preform to the cavity walls using pressurized fluid. The pressurized fluid can be pressurized positively with respect to atmosphere or even assisted with negative pressure between the cavity walls and the preform, i.e. in the form of a partial vacuum. In certain embodiments, an injection blow molding process may comprise a second step, a stretch rod may be used to elongate the hollow injection molded preform during the blow molding step—injection stretch blow molding.

Personal care articles are items used to store, dispense, apply or deliver benefits to a consumer's personal health, beauty, grooming, or other body or human biological system care, maintenance, enhancement or improvement. Examples of personal care articles include, but are not limited to toothbrushes, toothbrush handles, razors, razor handles, mop handles, vacuum handles, makeup or beauty care applicators, skin care applicators, feminine hygiene applicators, hair care applicators, hair colorant applicators, or hair care articles.

As shown in FIGS. 1-7, in certain embodiments, injection blow molding comprises two steps, combining the advantages provided by an injection molding process with an additional blow molding step bringing the injection molded preform into its final form. A personal care article, such as a toothbrush or toothbrush handle is not finally formed in the injection molding step, but in an additional, separate forming step after the injection-molded preform has been ejected from the injection mold.

Separating the manufacturing process into two separate steps of (1) injection molding a preform and a (2) subsequent blow molding step provides the advantage that the wall thickness of the toothbrush can be substantially controlled. In particular, pre-forming the toothbrush by injection molding and solidifying the injection-molded toothbrush preform to at least some extent provides the toothbrush with a substantially uniform wall thickness, or, if desired, a particular wall thickness distribution. In addition, the subsequent blow molding step eliminates the restrictions on the shape of the toothbrush that would be present if the final shape were created only in the injection mold. Further, the two-step process achieves very cost-efficient manufacturing of different toothbrushes varying in shape, as one basic preform type may be deformed in the blow forming process into different final toothbrush handles having different shapes. The blow mold has a cavity larger than the cavity of the injection mold and which substantially corresponds to the desired final shape of the exterior surface of the toothbrush handle. Fluid is then injected into the preform, blow mold cavity or both until the blow pressure arising inside the toothbrush pushes the wall of the preform against the walls of the cavity of the second stretch blow mold, thus giving the toothbrush its final shape.

In a first step, as shown in FIG. 1, a toothbrush handle preform is injection molded by melting a thermoplastic material in a barrel extruder 1 using a rotating screw 3 which moves backward as it rotates to create a volume of molten thermoplastic material 5 between the screw 3 and an exit orifice 7. The exit orifice 7 is in communication with a preform cavity 8 made by two preform mold sections 9A and 9B of a preform mold 9.

Figure 2:
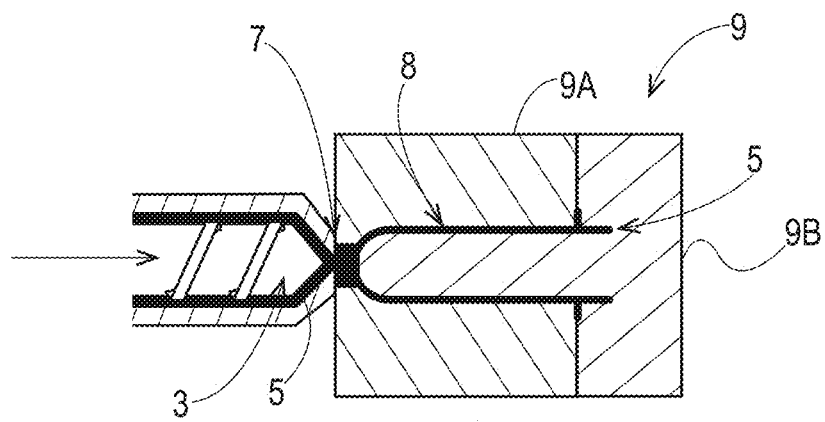
FIG. 2 is a sectional view of an injection molding step in an injection blow molding process according to an embodiment of the present invention.
Figure 3:
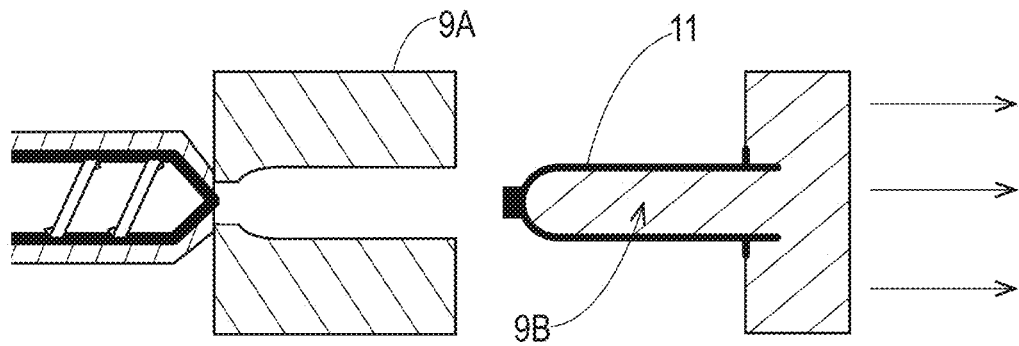
FIG. 3 is a sectional view of an injection-molded preform produced during an injection blow molding process according to an embodiment of the present invention.
Figure 5A:
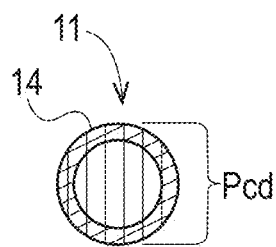
FIG. 5A is a cross-sectional view of FIG. 5 along section line 5A according to an embodiment of the present invention.
Figure 5B:
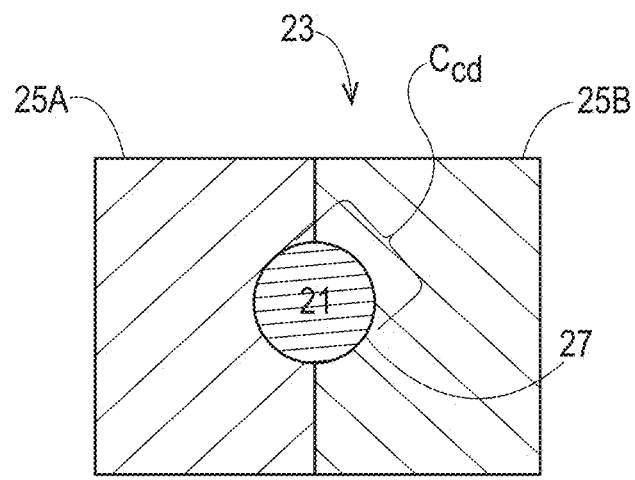
FIG. 5B is a cross-sectional view of FIG. 5 along section line 5B according to an embodiment of the present invention.
Figure 5C:
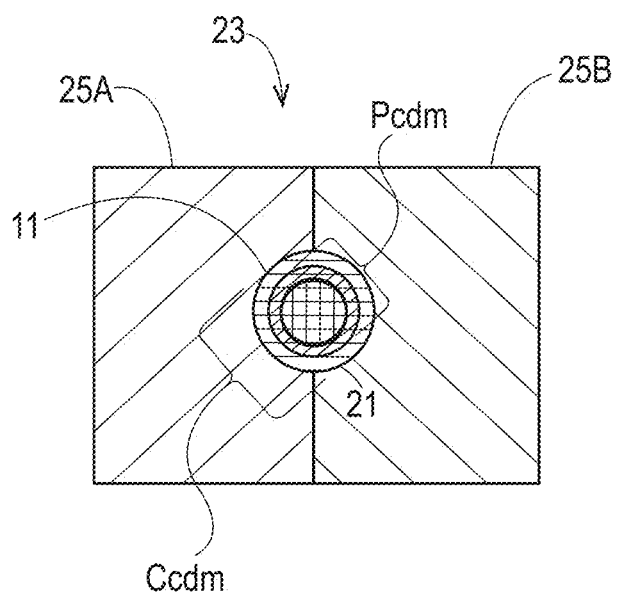
FIG. 5C is a cross-sectional view of FIG. 5 along section line 5C according to an embodiment of the present invention.
Figure 5D:
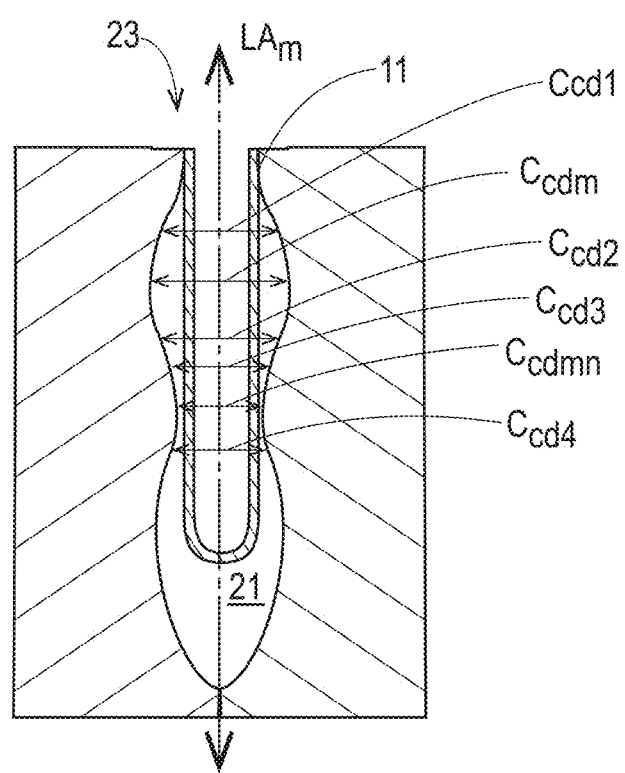
FIG. 5D is a sectional view of a blow mold process for producing a toothbrush handle according to an embodiment of the invention.

As shown in FIG. 2 the screw 3 is then forced against the volume of molten thermoplastic material 5, forcing thermoplastic material 5 through the orifice 7 into the cavity 8 until the cavity is filled 8. The thermoplastic material 5 cools against the walls of the cavity 8, which may be in turn cooled by internal channels filled with water or other coolant to speed the plastic solidification process. FIG. 3 shows that when the thermoplastic material 5 has solidified sufficiently to produce a toothbrush preform 11, the moving section of the preform cavity mold 9B is extracted, and through thermal contraction the toothbrush preform 11 exits the preform mold 9 attached to the moving section of the preform cavity mold 9B. The toothbrush preform 11 is removed from the moving section 9B using ejectors or some other means and is transferred to a blow molding step. In certain embodiments, in an intermediate step between removing the preform from the injection mold and expanding it in the blow mold, a preparatory heating step, cooling step, or both can be performed in which the preform coming from the injection mold in a solidified state is subjected to heating, partial cooling, or both so as to create a desired temperature distribution in the preform before it is subjected to expansion.

To allow fluid entrance for expanding the preform in the injection blow forming step, the preform may be provided with an opening which might be cut into the solidified preform after the injection molding step, but which in certain embodiments is already provided in the injection molding step. This air opening for the blow molding process may be positioned at various positions on the preform, for example at either end of a tubular shaped preform.

FIGS. 4 and 5 show in a second blow molding step, the toothbrush preform 11 is positioned into the blow mold cavity 21 of a blow mold 23 comprised of two mold sections 25A and 25B. As shown in FIGS. 5 and 5A the toothbrush preform 11 has a cross-sectional dimension ($P_{cd}$) which is the total area of the cross-section as defined by the outer surface 14 of the toothbrush preform 11. The toothbrush preform 11 may be re-heated to a temperature—either before it has been positioned into the blow mold cavity, or during, or both, that allows for significant plastic deformation at low stresses, but not to a temperature so hot as to permit significant deformation under gravity or complete melting.

FIG. 5 shows that the cavity sections 25A, 25B close around the toothbrush preform 11 to form the blow mold cavity 21. The blow mold cavity 21, as shown in FIG. 5B, has a cross-sectional dimension ($C_{cd}$), which is the total area of the cross-section as defined by the blow mold cavity surface 27. As shown in FIG. 5C the maximum cross-sectional dimension $C_{cdm}$ of the blow mold cavity 21 is greater than the maximum cross-sectional dimension $P_{cdm}$ of the toothbrush preform 11. Further, as FIG. 5D shows, to form contours in the blow mold cavity 21 a maximum cross-sectional dimension $C_{cdm}$ is bordered along the longitudinal axis $LA_m$ of the blow mold 23 by cross-sectional dimensions $C_{cd1}$, $C_{cd2}$ having a smaller area than the area of the maximum cross-sectional dimension $C_{cdm}$. Contours may also be formed in the blow mold cavity 21 by having a minimum cross-sectional dimension $C_{cdmn}$ bordered along the longitudinal axis $LA_m$ of the blow mold 23 by cross-sectional dimensions $C_{cd3}$, $C_{cd4}$ having a greater area than the area of minimum cross-sectional dimension $C_{cdmn}$.

FIGS. 5 and 6 show that once the cavity halves 25A, 25B have closed around the toothbrush preform 11 to form the blow mold cavity, a pressure differential is produced between the interior 12 and outer surface 14 of the toothbrush preform 11, either by application of an above-atmospheric (positive) pressure to the preform interior 12, and possibly assisted by a below-atmospheric (negative, or vacuum) pressure to the outer surface 14 (between the preform outer surface 14 and the blow mold cavity surface 27). This pressure differential causes the toothbrush preform 11 to increase in diameter until it contacts the blow mold cavity surface 27, at which point the rate of cooling of the molded toothbrush preform 11 increases substantially. As the toothbrush preform 11 cools under pressure differential, the final shape is produced. The cavity sections 25A, 25B, as shown in FIG. 7 are opened and the solidified toothbrush preform 11 is removed from the blow mold cavity 21. In an embodiment of injection blow molding, the preform may be stretched in the longitudinal direction during the blow molding step by means of a rigid, moving rod. This can selectively orient molecules in the plastic body to allow greater strength and/or stiffness with less wall thickness.

In one or more embodiments, as shown in FIGS. 15 and 16, of the present invention, a second component is attached to the toothbrush handle 220 to cover or block the opening through which fluid was injected in the blow molding step. This second component may comprise for example a toothbrush head, toothbrush neck, an end cap, a cover, an injection molded component, a blow molded component, a tufted component, a machined component, a metal component or a thermoplastic component.

Figures 8, 9:
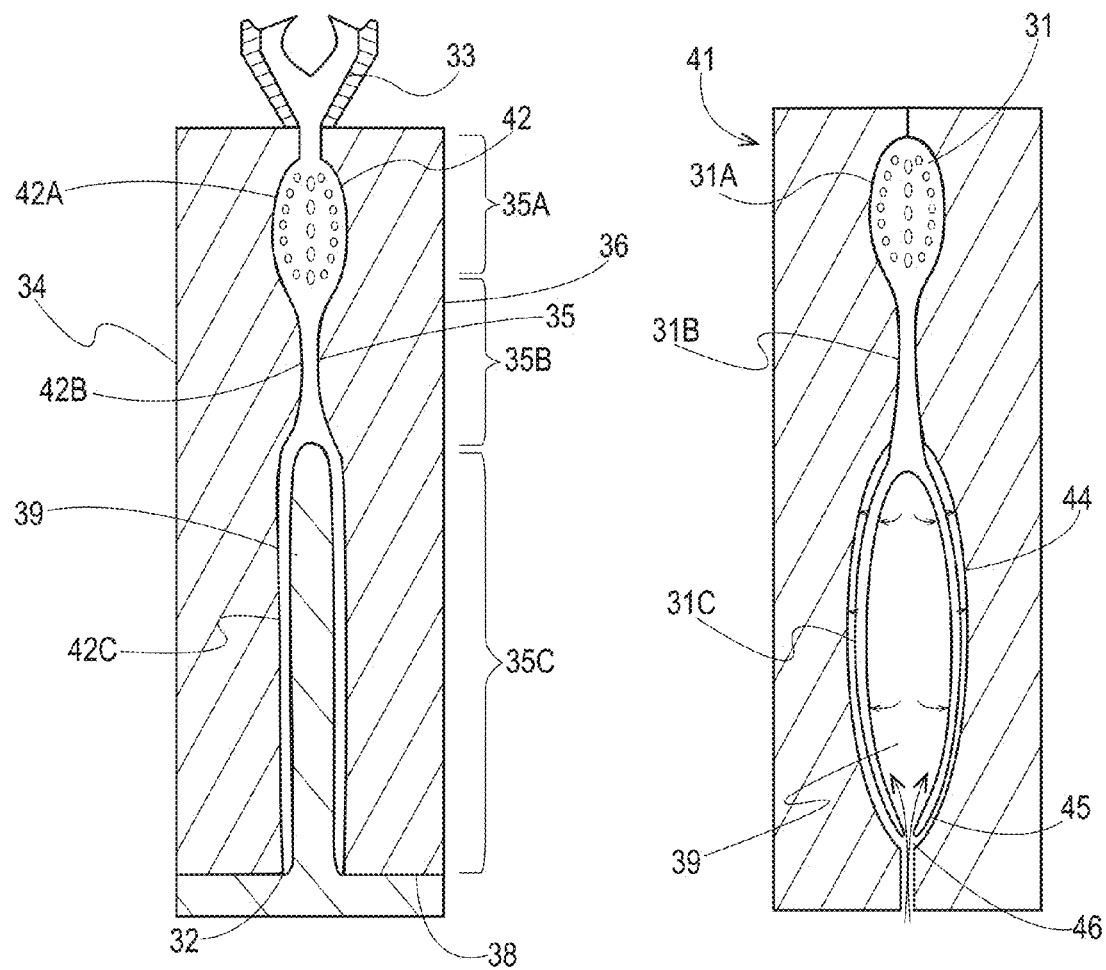
FIG. 8 is a sectional view of an injection step of the injection blow molding process for producing a toothbrush handle according to an embodiment of the present invention.
FIG. 9 is a sectional view of a blow molding step of the injection blow molding process for producing a toothbrush handle according to an embodiment of the present invention.

As shown in FIGS. 8-9, in certain embodiments, a complete toothbrush 31 with integrated head 31A, neck 31B and handle 31C may be formed by injection blow molding in a two-step process similar to the process described immediately above.

In a first step, as shown in FIG. 8, a toothbrush preform 42 is injection molded as above in a mold cavity portion 36 comprising a head portion 35A, a neck portion 35B and a handle portion 35C. There is a mold core portion 38. Molten thermoplastic 33 is injected to fill the cavity 35 created by the mold core portion 38 and mold cavity portion 36. In one embodiment of the present invention, molten thermoplastic may fill the cavity in order from head portion 42A, to neck portion 42B to handle portion 42C of the preform 42.

Following the injection step, the toothbrush preform 42 is transferred to a blow mold 41 containing a cavity 44 which is larger in at least one dimension than the cavity 35 in the injection mold cavity 36. In one embodiment of the present invention, the cavity portion 44 of the second mold 41 is larger in diameter in the handle portion 42C of the injection molded toothbrush preform 42. In another portion of the blow mold 41, the cavity surfaces are shaped to fit the head portion 42A, and possibly also the neck portion 42B of the toothbrush preform 42.

Following the transfer step, fluid pressure is applied to the inner core of the toothbrush preform 42 through a channel 46 near the base of the preform 45, inflating and expanding the handle 42C of the preform, enlarging the cavity 39 within the handle 42C. During the blow molding step, at least some portion of the toothbrush 31 is not deformed by the fluid pressure. In one embodiment of the present invention, the portion of the toothbrush 31 not deformed may comprise the head 31A. In another embodiment of the present invention the portion of the toothbrush 31 not deformed may comprise the head 31A and the neck 31B.

In an embodiment of the present invention the injection of the plastic in the injection molding step and the injection of fluid pressure in the blow molding step are located at opposite ends of the toothbrush preform. In another embodiment of the present invention the injection of the plastic in the injection molding step and the injection of fluid pressure in the blow molding step are located at or near the same end of the toothbrush preform.

Following the blow molding step, the toothbrush 31 is removed from the mold.

In one embodiment of the present invention, a second component is attached to the toothbrush handle to cover or block the opening through which fluid was injected in the blow molding step. This second component may comprise for example an end cap, a cover, an injection molded component, a blow molded component, a tufted component, a machined component, a metal component or a thermoplastic component.

The thermoplastic materials from which a toothbrush or toothbrush handle can be made is limited by (1) strength or resistance to bending and axial loading, (2) toughness, as the opposite of brittleness, (3) Class I medical device requirements, (4) chemical compatibility with a variety of toothpastes and active chemistries therein, (5) chemical compatibility with other components which are typically attached to toothbrush handles such as, decals, printed inks, labels, grip elements and the like, and (6) melt flow and melt strength compatible with injection blow molding. Thermoplastic materials meeting these criteria that can be used to make toothbrush handles include polypropylenes (PP); nylons (polyamides) (PA); polyethyleneterapthalates, including polyethyleneterpthalate glycols (PET & PET-G); low-density and high-density polyethylenes (LDPE & HDPE); polyesters (PE); polyvinylchlorides (PVC); and engineering plastics such as Acrylonitrile Butadiene Styrene (ABS), polyphenylene ether (PPE), polyphenylene oxide (PPO). Any sub-types of these materials or other thermoplastics, including blow-molding-grade thermoplastics, with melt flow indices between 0.3 and 3.0 or between 0.3 and 30.0 can be used if an injection blow molding process is used.

In certain embodiments two or more thermoplastic materials can be used to produce a toothbrush handle, for example a hard plastic material such as PP, PET, PET-G, LDPE, HDPE and one or more thermoplastic elastomers (TPE) chemically compatible with the first material, or even two materials that are similar in hardness, strength or durometer but differ merely in color. Examples of TPEs include Sytrenics (S-TPE), Copolyesters (COPE), Polyurethanes (TPU), Polyamides (PEBA), Polyolefin blends (TPO) and Polyolefin alloys (TPV). For example a Polyolefin-based TPE such as TPO would be used with a polyolefin based hard plastic such as Polypropylene, and both are introduced into the extrusion parison to form a toothbrush handle comprising portions made of different thermoplastic materials integrally connected to each other. For example, in toothbrush handles the surface portions that are contacted by the thumb or the finger tips can be made of soft plastic, whereas the remaining portions of the toothbrush handle can be made of hard plastic to give the toothbrush sufficient rigidity.

In certain embodiments of the present invention, a toothbrush handle may be made from multiple layers of material to create different tactile surfaces. Generally, in a multi-layer embodiment, an inner, or substrate, layer is made from a first material which is the main load-bearing material and is typically thicker than subsequent outer layers; and an outer layer may be made from a softer material which may have a higher coefficient of friction with skin, or other improved tactile features. But multiple layers may also be made from materials similar in durometer, hardness, strength or stiffness.

Layers may be made in one of two ways: (1) they may be injection molded together as is taught in EP 1 559 529 and EP 1559 530 then blown in a second step, or (3) they may be prepared separately through discrete processes and brought together only during the molding stage, where a parison of substrate material is extruded and a second material is extruded then cut into a patch or coupon, or is alternately injection molded by itself, and then placed into the mold cavity, which is known to those familiar in the art as in-mold labeling.

In certain embodiments of the invention, additional layers to the hollow toothbrush handle can be added by the method of In-Mold Labeling (IML). IML is used to place and position labels, such as TPE labels at one or more specific locations on the surface of the toothbrush handle. IML is the inclusion of one or more previously-manufactured flexible but solid components that will form an intrinsic part of the toothbrush handle by attaching and conforming intimately to the outer surface of the blow molded part. Positioning of the IML can be used to enhance the cosmetic appearance, texture, grip, feel, friction, coefficient of friction, or softness of the toothbrush handle, for example by using a vacuum to secure labels in position on the inner cavity wall of the mold prior to molding or using vacuum or vent ports to provide both positioning of the label in the part and a texture to the outer tactile surface of the IML portion of the toothbrush handle. The thickness and durometer of the TPE are selected to allow the TPE to deform substantially, and at least partially re-melt at the contact surface with the parison, so that labeling around a compound corner can be achieved with satisfactory cosmetic results.

Labels may include decorative elements, soft-touch elements (with a durometer between Shore A of about 20 and Shore A of about 90), grip areas, textured features, self-healing elements, brand or logo placements, hard materials, tufted inserts, or multiple-purpose elements. Further, labels can be made with a tactile surface-area-to-volume ratio (TSAV ratio) that is typically greater than can be achieved with injection molding. The TSAV for a label is defined here as the ratio of surface area visible or touchable by a user to the displaced or occupied volume of the label. For example, an insert may be from about 0.1 mm to about 0.4 mm thick and have a tactile cross-sectional area greater than about 400 $mm^2$. This label would therefore have a TSAV of 10 $mm^{-1}$ to 2.5 $mm^{-1}$. For injection-molded second components, it is difficult to achieve a TSAV greater than 2.0 $mm^{-1}$, whereas for in-mold labeling TSAV>10 $mm^{-1}$ is practical. A high TSAV is a distinct advantage for materials whose primary benefit derives from surface features such as coefficient of friction, color, surface texture or other decoration.

In certain embodiments of a multi-layer toothbrush made via IML, labels thickness is thin enough to substantially deform during the blow molding step so that labels conform to the three-dimensional shape or contours of the molding cavity and retain that shape after the toothbrush or toothbrush handle is removed from the mold. In certain embodiments labels made from a TPE based material may be under 0.30 mm, 0.25 mm, 0.20 mm or 0.10 mm thick. For example labels made from a PET-based TPE in the Shore A 30-50 range may be under 0.25 mm thick when the PET part wall is 1-3 mm thick to ensure adequate forming to mold cavity contours having radii of curvature less than 0.5/mm.

In another embodiment of a multi-layer toothbrush made via in-mold labeling, labels have a thickness allowing them to adhere chemically via re-melt to the blown preform during blown molding, but do not deform substantially at the outer surface. In some instances of this embodiment, labels may be pre-textured in an earlier extrusion step via embossing, or in an injection molding step. In this embodiment, labels may be thicker than 0.25 mm, 0.30 mm, or 0.40 mm.

In a still further embodiment of a multi-layer toothbrush made via IML, the label thickness is thin enough, for example thicker than 0.10 mm, 0.15 mm, or 0.2 mm to substantially deform during the blow molding step so that labels conform to and retain the macro-structure or macro-texture of the mold surface, but not so thin that they retain the micro-structure of the mold surface. In this instance, macro-structure is defined to comprise texture or features on a length scale greater than 0.1 mm such as tactile ribs, bosses, dimples or bumps; and micro-structure is defined to comprise texture or features on a length scale less than 0.05 mm such as grit-blasted textures, matte textures, witness lines or parting lines. In this embodiment, labels should be thicker than 0.10 mm.

In certain embodiments of the present invention, the TPE labels are die cut. In other embodiments of the invention, the TPE labels are injection molded in a separate first step and are inserted into the blow mold cavity in the blow molding step.

Labels may also be pre-decorated or pre-printed prior to installation during molding. The printing can be done on the outside surface of the label, or if the label is transparent or translucent, the printing can be done on the inner surface of the label that will be in contact with the toothbrush or toothbrush handle outer surface. In this embodiment, the printed label's inner surface can be isolated from the user, from chemicals, and water, which provides for improved durability.

In addition to vacuum-assisted In-Mold Labeling, there are a number of methods by which decoration can be added to a toothbrush handle. For example, a shrink sleeve may be wrapped around a toothbrush or portion thereof, for instance a toothbrush handle and shrunk by application of heat, steam, or both to create a form-fitting decorative sleeve which is tightly attached to the handle. This sleeve may have one end wrapped over a shoulder to which a head or head and neck portion is attached. The sleeve may also have the other end tucked under a cap, for which the molded portion of the handle is designed. This may serve to seal one or both open edges of the shrink sleeve and protect from entry of water or other contaminants, or may just assist in decoration, design, and feel in the hand. Either end, neither end, or both ends of the sleeve may be tucked and contained under a separately attached part such as a head or a cap.

In another embodiment, decoration may be printed directly onto the surface of a toothbrush handle following the blow molding operation. The printing of decoration may also be performed on the preform before the blowing operation to take advantage of the single ruled nature of the preform outer surface prior to blowing into a compound surface that would be difficult or impossible to print efficiently.

Figure 10:
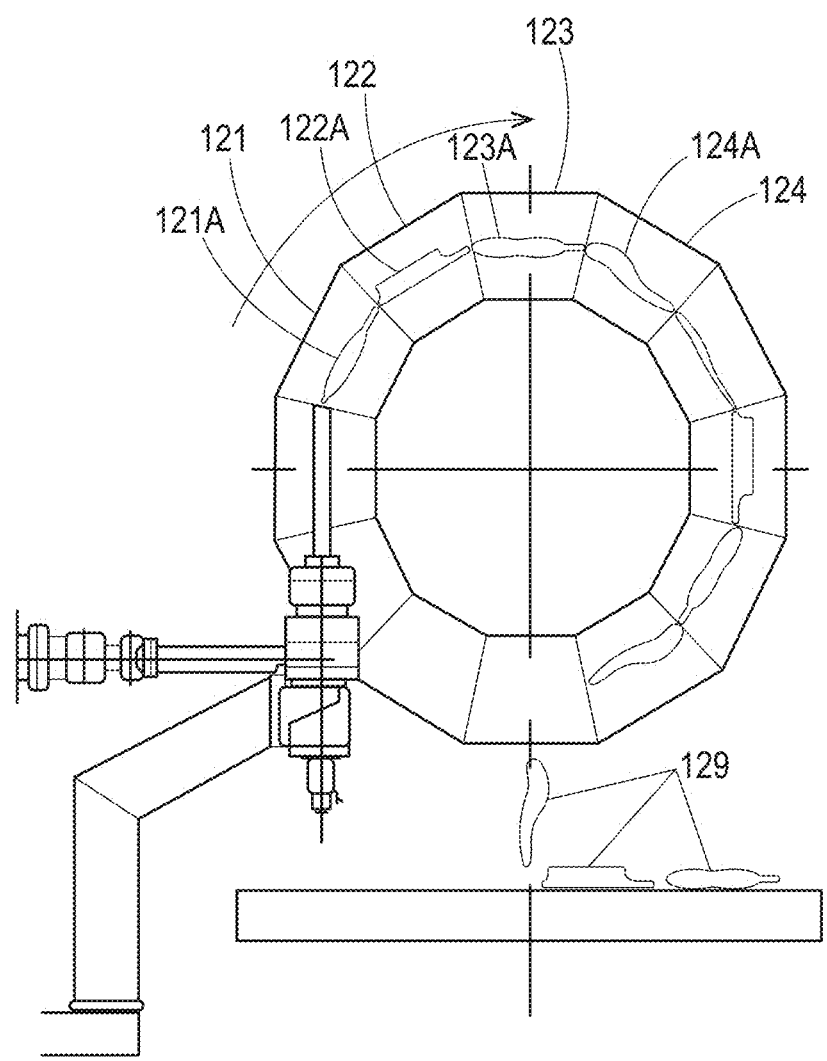
FIG. 10 is a diagram of an extrusion blow molding process for producing a toothbrush handle according to an embodiment of the present invention.

In addition, in any blow molding embodiment, such as that shown in FIG. 10, the blow mold cavities can differ from one blow mold to the next, so that a single process can produce multiple differing toothbrushes or toothbrush handles in direct sequence. For example as shown in FIG. 10 blow molds 121, 122, 123, 124 mounted in a wheel configuration have a series of different shaped cavities 121A, 122A, 123A, 124A to create toothbrush handles 129 with different shapes.

Figure 11:
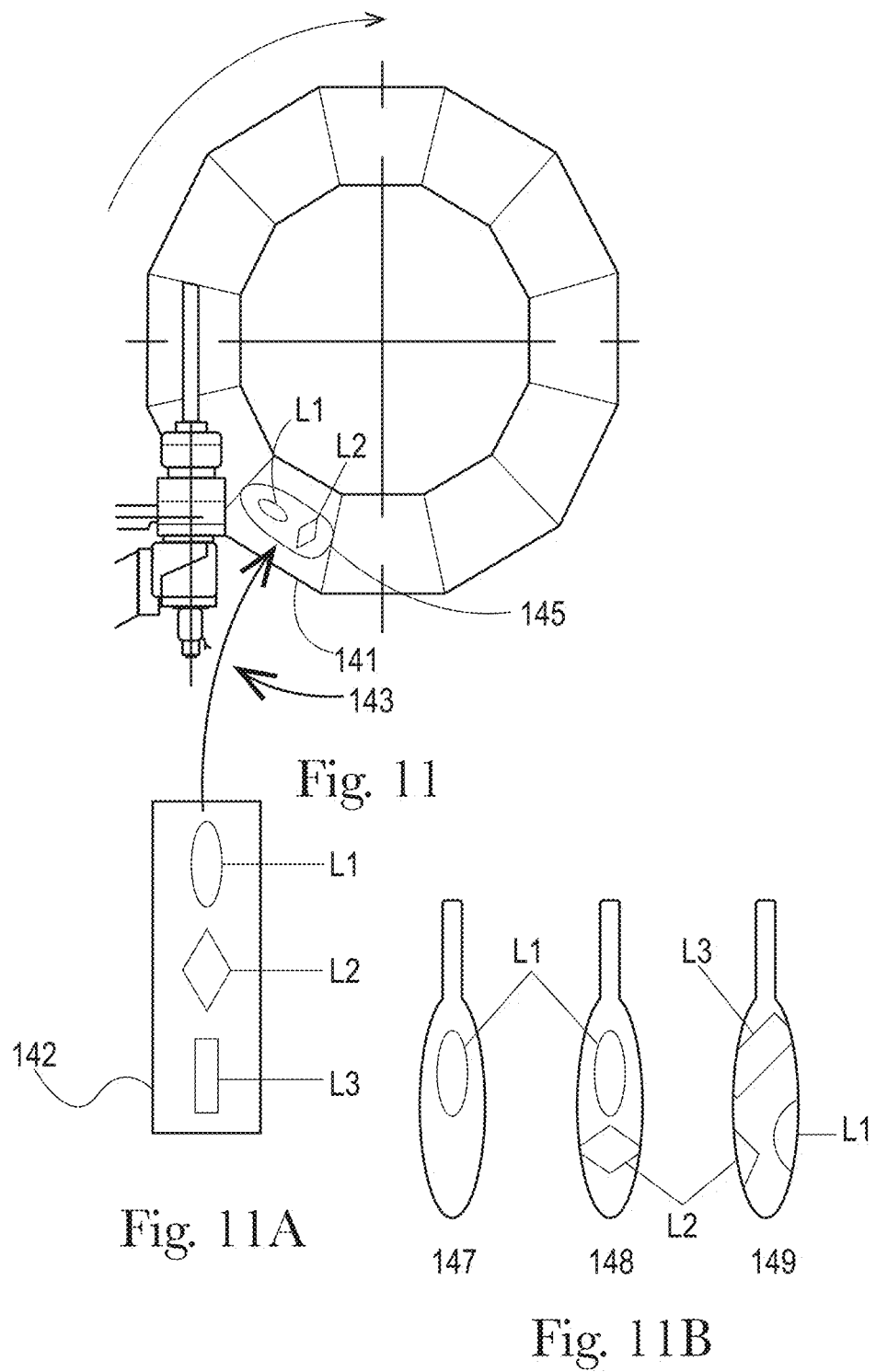
FIG. 11A is a diagram of an extrusion blow molding process for producing a toothbrush handle according to an embodiment of the present invention.
FIG. 11B is a diagram of an insert mechanism for an extrusion blow molding process for producing a toothbrush handle according to an embodiment of the present invention.
FIG. 11C is an illustration of toothbrush handles according to an embodiment of the present invention.

In any blow molding embodiment, such as that shown in FIG. 11A, the blow molding configuration may include a labels insert mechanism, such as a servo-controlled placement arm or a robot arm, as shown in FIG. 11B.

In certain embodiments the insert mechanism may contain multiple labels, for example as shown in FIG. 11B the insert mechanism 142 includes multiple labels L1, L2, L3. The labels $L_1$, $L_2$ can be placed inside the open cavity halves 141 by a handling and feeding mechanism 143. One or more labels $L_1$, $L_2$ can be placed inside a cavity 145 at the same time to form toothbrush handles 147, 148, 149 having different labels $L_1$, $L_2$, $L_3$, as shown in FIG. 11C. The labels can have different shapes, thickness, colors, texture, materials and print. The labels are typically held inside the tool cavity by vacuum or may be held in areas of tight curvature by friction and bending alone. In certain embodiments there are between about one to ten labels per mold or from about one to three labels per mold. In certain embodiments labels may be exposed on the outer surface of a toothbrush or toothbrush handle; or partially or completely embedded within the preform; or any combination thereof. For example a label may be completely or partially embedded in a transparent or translucent toothbrush or toothbrush handle so it can still be viewed or an label may be exposed on the toothbrush handle surface for viewing.

As the toothbrush or toothbrush handle leaves the manufacturing equipment the toothbrush handle can be post processed, decorated, assembled with other parts and packed.

Figure 12:
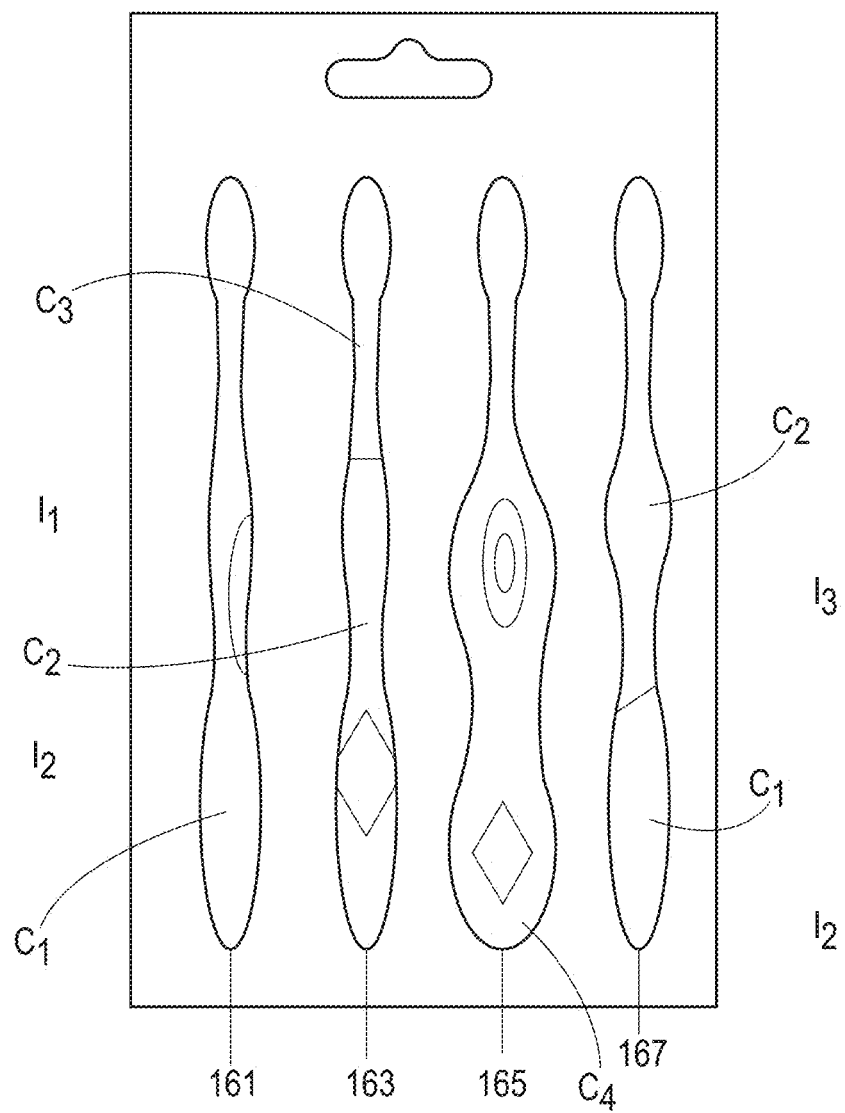
FIG. 12 is an illustration of toothbrushes according to an embodiment of the present invention.

FIG. 12 shows a package containing a variety of toothbrushes 161, 163, 165, 167 each toothbrush having an individual and differing shape, color or color combinations C1, C2, C3, C4 and labels $L_4$, $L_5$, $L_6$.

FIG. 13 shows an embodiment of a personal care article that can be produced using one or more of the methods of the present invention, in this instance a toothbrush 200, having a handle 201, neck 205, and head 203, terminal end 208 and a head end 209. The toothbrush 200 is unitarily formed as a single piece and comprises an inner cavity 210 and an outer surface 202, wherein the toothbrush outer surface 202 varies in cross-sectional area ($OS_{CA}$), which is the total area of the cross-section as defined by the outer surface 202, along the toothbrush 200 longitudinal axis L—as shown in FIG. 13A; in this embodiment the toothbrush 200 has a substantially hourglass shape. The inner cavity 210 has an inner cavity surface 211, wherein the inner cavity surface 211 varies in cross-sectional area ($IC_{CA}$) along the toothbrush longitudinal axis L. As FIG. 13 shows, in certain embodiments the inner cavity 210 of the toothbrush 200 has one or more greater cross-sectional areas $IC_{CDM}$ bordered along the longitudinal axis L of the toothbrush 200 by lesser cross-sectional areas $IC_{CD1}$, $IC_{CCD2}$ having a smaller area than the area of the greater cross-sectional area $IC_{CDM}$. A toothbrush 200 inner cavity 210 may also have a lesser cross-sectional area $IC_{CDMN}$ bordered along the longitudinal axis L of the toothbrush 200 by greater cross-sectional areas $IC_{CD3}$, $IC_{CD4}$ having a larger area than the area of the lesser cross-sectional area $IC_{CDMN}$. Further, as shown in FIGS. 13, 13A and 13B, in certain embodiments the square root of the inner cavity surface 211 cross-sectional area varies proportionally to the variations in the square root of the outer surface 202 cross-sectional area along the longitudinal axis L of the toothbrush 200, with the exception of the areas near the terminal 208 and head end 209 of the toothbrush where the inner cavity 210 may be sealed. In certain embodiments the square root of the inner cavity surface cross-sectional area varies proportionally less than 5% to the variations in the square root of the outer surface cross-sectional area along the longitudinal axis L of the toothbrush 200 with the exception of the areas near the terminal and head end of the toothbrush handle. In certain embodiments the thickness of the toothbrush wall, the distance between the toothbrush outer surface and the inner cavity surface, varies in inverse proportion to the square root of the outer surface cross-sectional area. For example, in these embodiments areas of a toothbrush or toothbrush handle having a greater outer surface cross-sectional area will have a thinner wall (compared to areas having a lesser outer surface cross-sectional area) as the material has been stretched to a greater degree during the blow molding step. It is possible also in the case of injection blow molding to injection mold a preform with a wall whose initial thickness varies with length so that thicker or thinner wall sections can be blow molded during the blow molding step. In certain embodiments the thickness of the toothbrush wall and the thickness of the individual layers for those embodiments having two or more layers varies less than about 20%, 10% or 5% along the toothbrush handle longitudinal axis.

FIG. 14 shows an embodiment of the present invention where the blow molded toothbrush handle 210 includes a hollow portion that may extend into the neck 205 of the toothbrush.

FIGS. 15 and 16 show an embodiment of the present invention where the hollow toothbrush handle 220 is assembled to a head-neck portion 223 following the blow molding step. In an embodiment of the present invention, connection features 231 may be molded onto a portion of the handle 220 during the injection molding step to connect to features 233 of the head-neck portion 223 during the assembly step.

Figure 17:
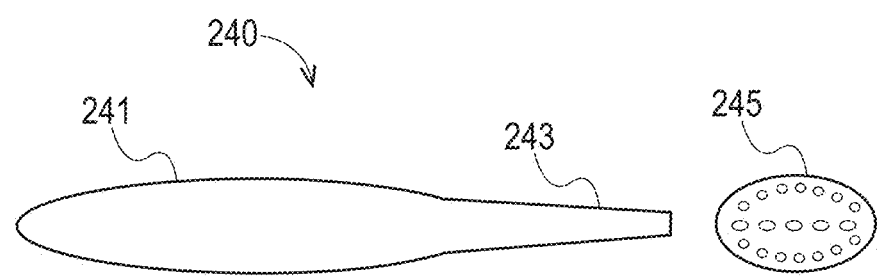
FIG. 17 is a diagram of a toothbrush according to an embodiment of the present invention.

FIG. 17 shows an embodiment of the present invention where a hollow toothbrush handle 240 includes a neck portion 243 which is connected to a head portion 245. In an embodiment of the present invention, the head portion 245 may be tufted.

Figure 18:
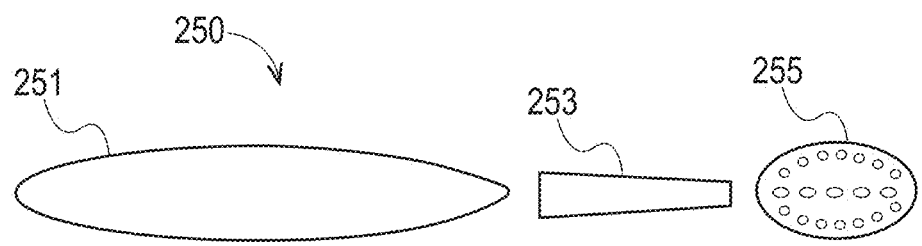
FIG. 18 is a diagram of a toothbrush according to an embodiment of the present invention.

FIG. 18 shows an embodiment of the present invention where a blow molded toothbrush handle 250 does not include a neck portion and is attached to a neck portion 253 which is separate from the head portion 255 and handle portion 251.

In certain embodiments a toothbrush handle may be made from multiple layers of thermoplastic material, for example to create different tactile surfaces. Wherein the layers of thermoplastic material may be present on or in the toothbrush handle outer surface. Generally, in a two-layer embodiment, an inner, or substrate, layer is made from a first thermoplastic material which is the main load-bearing material and is typically thicker than subsequent outer layers; and an outer layer may be made from a softer thermoplastic material which may have a higher coefficient of friction with skin, or other improved tactile features.

The toothbrushes and toothbrush handles of the present invention having an inner cavity can help reduce the amount of excessive force being applied to the toothbrush during brushing, such as when using a typical solid manual toothbrush or electromechanical toothbrush. It is known to those familiar in the art that sustained, repeated brushing with a standard tufted, manual toothbrush with a force of greater than approximately 5.0 N can lead to a loss of gum tissue over time. For instance there exist electromechanical toothbrushes with integrated feedback systems to warn users when this force is exceeded during use. This suggests that a significant fraction of toothbrush users apply forces up to 5.0N through the toothbrush head.

Not all hollow, articles have sufficient bending strength to withstand 5N of force applied in bending normal to the major axis at a distance typical of that applied to a toothbrush between a thumb-fulcrum and the brush head. Certainly not all blow molded articles can withstand such forces: many blow molded packages, such as water bottles, must be filled prior to stacking in pallets as their walls are sufficiently thin that they will significantly deform in compression under even the weight of a few empty bottles on top of them. It is possible to make toothbrushes and toothbrush handles in a similar fashion, either through use of generally weak materials or through manufacture of extreme thinness of walls, such that they would appear strong, possibly due to use of opaque materials or other decoration. Toothbrushes made from these handles would not collapse under gravity or mild forces, and could appear robust in packaging or in a non-use display but in fact would be displeasing or impossible to use as intended, or to deliver sufficient brushing force to maintain oral health. Generally, toothbrushes or toothbrush handles which deform more than 10 mm under a 5.0N force applied to the center in a manner similar to ASTM D 790 would not be desirable in use. In certain embodiments the toothbrush handles of the present invention deform less than about 10 mm under a 5.0N force applied in a manner similar to ASTM D 790. In certain embodiments the toothbrush handles of the present invention deform less than about 5 mm under a 5.0N force applied in a manner similar to ASTM D 790.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method for injection blow molding a toothbrush using thermoplastic material, comprising:
   a) providing an injection mold having a cavity, wherein the cavity includes a head portion, neck portion, and handle portion;
   b) injecting thermoplastic material into the injection mold cavity, in the order of the head portion, to the neck portion, to the handle portion, to form a toothbrush preform having an inner cavity and an outer surface, wherein the outer surface defines a cross-sectional dimension of the toothbrush preform;
   c) providing a blow mold having a longitudinal axis and a cavity, the cavity having a surface that defines a cross-sectional dimension having an area; wherein the cavity has at least one of a maximum cross-sectional dimension and the maximum cross-sectional dimension bordered by two smaller cross-sectional dimensions along the longitudinal axis of the blow mold or a minimum cross sectional dimension bordered by two greater cross-sectional dimensions along the longitudinal axis of the blow mold;
   d) positioning the toothbrush preform into the blow mold cavity;
   e) deforming the toothbrush preform using a fluid to produce a toothbrush having a contoured enlarged inner cavity as compared to the toothbrush preform inner cavity prior to the deforming step;
   wherein the head of the toothbrush is molded during the injection molding step and is connected intrinsically to the handle which is also molded during the injection molding step, and wherein at least one of the toothbrush head or toothbrush handle is not deformed during the deforming step.

2. The method of claim 1, wherein the toothbrush preform is heated or cooled prior to being positioned into the blow mold cavity.

3. The method of claim 1, wherein the blow mold cavity has a larger maximum cross-sectional dimension than the maximum cross-sectional dimension of the toothbrush preform.

4. The method of claim 1, wherein the fluid expands the toothbrush preform to the maximum cross-sectional dimension of the blow mold cavity.

5. The method of claim 1, wherein the fluid expands the toothbrush preform to the two larger cross-sectional dimensions.

6. The method of claim 1, wherein the fluid is injected into the toothbrush preform inner cavity.

7. The method of claim 1, wherein the injection mold includes one or more inserts prior to injection of the thermo plastic material.

8. The method of claim 1, wherein only a portion of the toothbrush preform is deformed and only the portion to be deformed is heated.

* * * * *